United States Patent
Yong

(10) Patent No.: US 8,737,399 B2
(45) Date of Patent: May 27, 2014

(54) ENHANCED HIERARCHICAL VIRTUAL PRIVATE LOCAL AREA NETWORK SERVICE (VPLS) SYSTEM AND METHOD FOR ETHERNET-TREE (E-TREE) SERVICES

(75) Inventor: Lucy Yong, McKinney, TX (US)

(73) Assignee: Futurewei Technologies, Inc., Plano, TX (US)

( * ) Notice: Subject to any disclaimer, the term of this patent is extended or adjusted under 35 U.S.C. 154(b) by 344 days.

(21) Appl. No.: 12/983,605

(22) Filed: Jan. 3, 2011

(65) Prior Publication Data

US 2011/0164617 A1 Jul. 7, 2011

Related U.S. Application Data

(60) Provisional application No. 61/292,441, filed on Jan. 5, 2010, provisional application No. 61/305,428, filed on Feb. 17, 2010, provisional application No. 61/367,741, filed on Jul. 26, 2010.

(51) Int. Cl.
*H04L 12/28* (2006.01)

(52) U.S. Cl.
USPC ........ 370/392; 370/395.2; 370/401; 370/408; 709/223; 709/252

(58) Field of Classification Search
USPC ........ 370/392, 395.2, 401, 408; 709/223, 252
See application file for complete search history.

(56) References Cited

U.S. PATENT DOCUMENTS

| | | | |
|---|---|---|---|
| 8,385,355 B1* | 2/2013 | Figueira et al. | 370/401 |
| 2008/0304485 A1* | 12/2008 | Sinha et al. | 370/392 |
| 2010/0074098 A1* | 3/2010 | Zeng et al. | 370/217 |
| 2010/0142537 A1* | 6/2010 | Lee et al. | 370/395.53 |
| 2011/0274112 A1* | 11/2011 | Czaszar et al. | 370/392 |

OTHER PUBLICATIONS

Bradner, S., "Key Words for Use in RFCs to Indicate Requirement Levels," RFC 2119, Mar. 1997, 3 pages.
Rosen, E., et al., "MPLS Label Stack Encoding," RFC 3032, Jan. 2001, 22 pages.
Bryant, S., Ed., et al., "Pseudo Wire Emulation Edge-to-Edge (PWE3) Architecture," RFC 3985, Mar. 2005, 43 pages.
Martini, L., et al., "Pseudowire Setup and Maintenance Using the Label Distribution Protocol (LDP)," RFC 4447, Apr. 2006, 34 pages.
Martini, L., Ed., et al., "Encapsulation Methods for Transport of Ethernet Over MPLS Networks," RFC 4448, Apr. 2006, 25 pages.
Anderson, L., Ed., et al., "Framework for Layer 2 Virtual Private Networks (L2VPNs)," RFC 4664, Sep. 2006, 44 pages.
Kompella, K., et al., "Virtual Private LAN Service (VPLS) Using BGP for Auto-Discovery and Signaling," RFC 4761, Jan. 2007, 28 pages.

(Continued)

*Primary Examiner* — Nicholas Sloms

(74) *Attorney, Agent, or Firm* — Conley Rose, P.C.; Grant Rodolph; Rayhao Chung

(57) ABSTRACT

A network apparatus comprising a trunk end point associated with an Ethernet-tree (E-Tree) service in a network domain and configured to forward a frame that comprises a tag according to the tag in the frame, wherein the tag in the frame is a root tag that indicates a root source of the frame or a leaf tag that indicates a leaf source of the frame, and wherein the trunk end point is coupled to a second end point associated with the E-tree service outside the network domain.

20 Claims, 9 Drawing Sheets

(56) References Cited

OTHER PUBLICATIONS

Lasserre, M., et al., "Virtual Private LAN Service (VPLS) Using Label Distribution Protocol (LDP) Signaling," RFC 4762, Jan. 2007, 31 pages.
Jiang, Y., et al., "VPLS PE Model for E-Tree Support," draft-jinag-l2vpn-vpls-pe-etree-02.txt, Oct. 25, 2010, 16 pages.
Key, Raymond, et al., "A Framework for E-Tree Service over MPLS Network," draft-key-l2vpn-etree-frwk-04.txt, Oct. 7, 2010, 27 pages.
Key, Raymond, et al., "Requirements for MEF E-Tree Support in VPLS," draft-key-l2vpn-vpls-etree-reqt-02.txt, Oct. 7, 2010, 14 pages.
"IEEE Standard for Local and Metropolitan Area Networks, Virtual Bridged Local Area Networks, Amendment 4: Provider Bridges," IEEE 802.1 ad™, May 26, 2006, 73 pages.
"IEEE Standard for Local and Metropolitan Area Networks, Virtual Bridged Local Area Networks," IEEE Std. 802.1Q, 2005, 301 pages.
Key, R., et al., "A Framework for E-Tree Service Over MPLS Network," draft-key-l2vpn-etree-frwk-00.txt, Nov. 9, 2009, 21 pages.
Key, R., et al., "A Framework for E-Tree Service Over MPLS Network," draft-key-l2vpn-etree-frwk-01.txt, Jan. 22, 2010, 32 pages.
Key, R., et al., "Extension to VPLS for E-Tree," draft-key-l2vpn-etree-01.txt, Nov. 9, 2009, 25 pages.
Key, R., et al., "Extension to VPLS for E-Tree," draft-key-l2vpn-vpls-etree-02.txt, Jan. 22, 2010, 26 pages.
Key, R., et al., "Extension to VPLS for E-Tree," draft-key-l2vpn-vpls-etree-04.txt, Oct. 7, 2010, 26 pages.
Ram, R., et al., "Extension to LDP-VPLS for E-Tree Using Two PW," draft-ram-l2vpn-ldp-vpls-etree-2pw-00.txt, Oct. 4, 2010, 7 pages.
Sajassi, A., et al., "VPLS Interoperability With CE Bridges," draft-ietf-l2vpn-vpls-bridge-interop-04.txt, Nov. 2007, 20 pages.
Sajassi, A., et al., "VPLS Interoperability With CE Bridges," draft-ietf-l2vpn-vpls-bridge-interop=05.txt, Mar. 8, 2010, 17 pages.
Sajassi, A., et al., "VPLS Interoperability With CE Bridges," draft-ietf-l2vpn-vpls-bridge-interop-06.txt, Oct. 24, 2010, 20 pages.
"Draft Standard for Local and Metropolitan Area Networks—Virtual Bridged Local Area Networks—Amendment 9: Shortest Path Bridging," IEEE P802.1aq/ D3.0, Jun. 10, 2010, 246 pages.
Balus, F., et al., "Extensions to VPLS PE Model for Provider Backbone Bridging," draft-ietf-l2vpn-pbb-vpls-pe-model-00.txt, May 12, 2009, 15 pages.
Balus, F., et al., "Extensions to VPLS PE Model for Provider Backbone Bridging," draft-ietf-l2vpn-pbb-vpls-pe-model-01.txt, Jan. 7, 2010, 15 pages.
Balus, F., et al., "Extensions to VPLS PE Model for Provider Backbone Bridging," draft-ietf-l2vpn-pbb-vpls-pe-model-02.txt, Jul. 12, 2010, 15 pages.
"Draft Standard for Local and Metropolitan Area Networks—Virtual Bridged Local Area Networks—Amendment <>: Shortest Path Bridging," IEEE P802.1aq/ D3.2, Oct. 8, 2010, 266 pages.
Delord, S., et al., "Control Word Reserved bit for use in E-Tree", draft-delord-pwe3-cw-bit-etree-04.txt, Oct. 7, 2010, 9 pages.
Sajassi, A., et al., "L2VPN OAM Requirements and Framework", draft-ietf-l2vpn-oam-req-frmk-11.txt, Oct. 24, 2010, 37 pages.
Andersson, L., et al., "LDP Specification", RFC 3036, Jan. 2001, 124 pages.
Rekhter, Y., et al., "Carrying Label Information in BGP-4", RFC 3107, May 2001, 9 pages.
Scudder, J., et al., "Capabilities Advertisement with BGP-4", RFC 5492, Feb. 2009, 8 pages.
Thomas, B., et al., "LDP Capabilities", RFC 5561, Jul. 2009, 13 pages.
"Annex of G.8010v2 to describe the PVT network application", Telecommunication Standardization Sector, Study Group 15—Contribution 815, Jan. 2008, 15 pages.
Jiang, Y., et al., "VPLS PE Model for E-Tree Support", draft-jiang-l2vpn-vpls-pe-etree-00.txt, Mar. 1, 2010, 14 pages.
Foreign Communication from a Related Counterpart Application, PCT Application PCT/US2011/020110, International Search Report dated Feb. 26, 2013, 4 pages.
Foreign Communication from a Related Counterpart Application, PCT Application No. PCT/US2011/020110, Written Opinion dated Feb. 26, 2013, 8 pages.
Fang, L., et al., "The Evolution of Carrier Ethernet Services—Requirements and Deployment Case Studies", IEEE Communications Magazine, Next-Generation Carrier Ethernet Transport Technologies, Mar. 2008, 8 pages.

\* cited by examiner

Root Tag ———
Leaf Tag — — ·

ENHANCED HIERARCHICAL VIRTUAL PRIVATE LOCAL AREA NETWORK SERVICE (VPLS) SYSTEM AND METHOD FOR ETHERNET-TREE (E-TREE) SERVICES

CROSS-REFERENCE TO RELATED APPLICATIONS

The present application claims the benefit of U.S. Provisional Patent Application No. 61/292,441, filed Jan. 5, 2010 by Lucy Yong and entitled "Enhanced Hierarchical VPLS System and Method for E-Tree Services," and U.S. Provisional Patent Application No. 61/305,428, filed Feb. 17, 2010 by Lucy Yong and entitled "E-Tree Service Interworking Across Multiple MEN and MPLS Networks," which are incorporated herein by reference as if reproduced in their entirety. The present application also claims the benefit of U.S. Provisional Patent Application No. 61/367,741, filed Jul. 26, 2010 by Lucy Yong and entitled "Virtual Private Local Area Network Service (VPLS) Extension and Label Distributed Protocol Extension for VPLS in Supporting (E)-Tree."

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet comprises a family of frame-based computer networking technologies for local area networks (LANs), and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data frames to be transported across different types of mediums using various nodes each having different transmission speeds. Some Ethernet based networks may forward the data frames from one node to another node across the network along pre-configured or pre-established paths. In such cases, the nodes may create Ethernet-LAN (E-LAN) services, where traffic that corresponds to different services may be transported along different sub-networks, e.g. by different subsets of nodes. For example, the E-LAN services may comprise the Institute of Electrical and Electronics Engineers (IEEE) 802.1aq network services or Virtual Private LAN Services (VPLS).

SUMMARY

In one embodiment, the disclosure includes a network apparatus comprising a trunk end point associated with an Ethernet-tree (E-Tree) service in a network domain and configured to forward a frame that comprises a tag according to the tag in the frame, wherein the tag in the frame is a root tag that indicates a root source of the frame or a leaf tag that indicates a leaf source of the frame, and wherein the trunk end point is coupled to a second end point associated with the E-tree service outside the network domain and performs tag translation when sending a frame.

In another embodiment, the disclosure includes a network component comprising a receiver unit configured to receive a frame on an E-LAN service in a network domain, a circuit logic configured to detect a tag in the frame and perform a tag translation if the tag is a root tag or a leaf tag, and a transmitter unit configured to forward the frame on the E-LAN service according to the tag translation.

In yet another embodiment, the disclosure includes a system comprising two VPLS provider edges (PEs) with a virtual switching instance (VSI) in each of them inter-connected via a pseudowire (PW), wherein both VPLS PEs are attached to roots and leaves; at the PE where a frame exits the PW, if a frame with the remote virtual LAN (VLAN) leaf tag is received, then it is mapped to the local VLAN leaf tag, otherwise, if a frame with the remote VLAN root tag is received, then it is mapped to the local VLAN root tag, wherein packets over both VLANs are processed in the same customer MAC space and are further forwarded or dropped in the exit bridge module using the mechanism as described in 802.1Q.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An E-Tree service is an Ethernet service defined by the Metro Ethernet Forum (MEF). The E-Tree service may be implemented for a plurality of applications in a network, where data may be exchanged in the form of Ethernet frames and forwarded according to MAC addresses. Two types of ports are defined in the E-Tree service: root ports and a leaf ports; and each port may be located at a plurality of nodes in the network. The root ports and leaf ports may exchange unicast, multicast, and/or broadcast frames, where data frames from a root port may be forwarded to other root ports and/or leaf ports. However, leaf-to-leaf communications are not allowed in an E-Tree service. Accordingly, data frames from a leaf port may only be forwarded to the root ports, but not to other leaf ports. To help prevent leaf to leaf communications, IEEE has defined an asymmetric VLAN across learning in which the E-Tree service may be implemented by IEEE 802.1Q using two VLAN tags to distinguish between the data forwarded from root ports and data forwarded from leaf ports.

Figure 1:
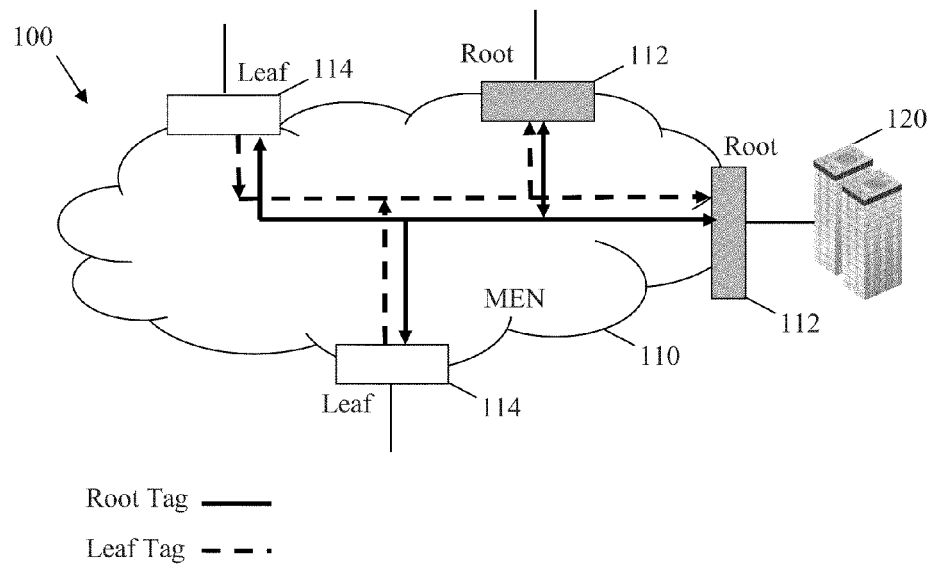
FIG. 1 is a schematic diagram of an embodiment of an E-Tree service.

FIG. 1 illustrates an embodiment of an E-Tree service 100 in an Ethernet bridged network domain 110. The Ethernet bridged network domain 110 may be one of a plurality of domains in an Ethernet bridged network. The E-Tree service 100 may be based on IEEE 802.1Q and the Ethernet bridged network domain 110 may correspond to a Metropolitan Ethernet Network (MEN). The Ethernet bridged network domain 110 may comprise a plurality of edge nodes, e.g. PEs, that comprise a plurality of ports. At least some of the ports may be associated with the E-Tree service 100, where each of the ports may be configured as a root port 112 or a leaf port 114 but not both. The root ports 112 and the leaf ports 114 in the PEs may exchange data frames with other PEs in the Ethernet bridged network domain 110 using the E-Tree service 100 and possibly with other nodes external to the Ethernet bridged network domain 110 (not shown). A root port 112 or a leaf port 114 in a PE also may be coupled to a customer site 120 and exchange data with the customer site 120.

According to the E-Tree service rules, the root ports 112 may forward the data frames to other root ports 112, to the leaf ports 114, or both. However, the leaf ports 114 may only forward the data frames to the root ports 112, not the other leaf ports 114. To forward the data frames properly according to such rules, the data frames forwarded from the root ports 112 and leaf ports 114 may be differentiated using different tags. As such, the data frames forwarded from the root ports (indicated by solid arrow lines) may be associated with a root tag, and the data frames forwarded from the leaf ports 114 (indicated by a dashed arrow line) may be associated with a leaf tag. The root ports 112 and leaf ports 114 may add the root tags and the leaf tags, respectively, to data frames received from external nodes, and then forward the data frames inside the Ethernet bridged network domain 110. The root ports 112 and the leaf ports 114 also may remove the root tags and the leaf tags, respectively, from data frames received inside the Ethernet bridged network domain 110, and then forward the data frames to external nodes, e.g. to the customer site 120. The data frames may be forwarded using the E-Tree 100 service in the Ethernet bridged network domain 110 according to standard Ethernet frame forwarding rules, e.g. using MAC based forwarding, broadcasting unknown address data, etc.

Figure 2:
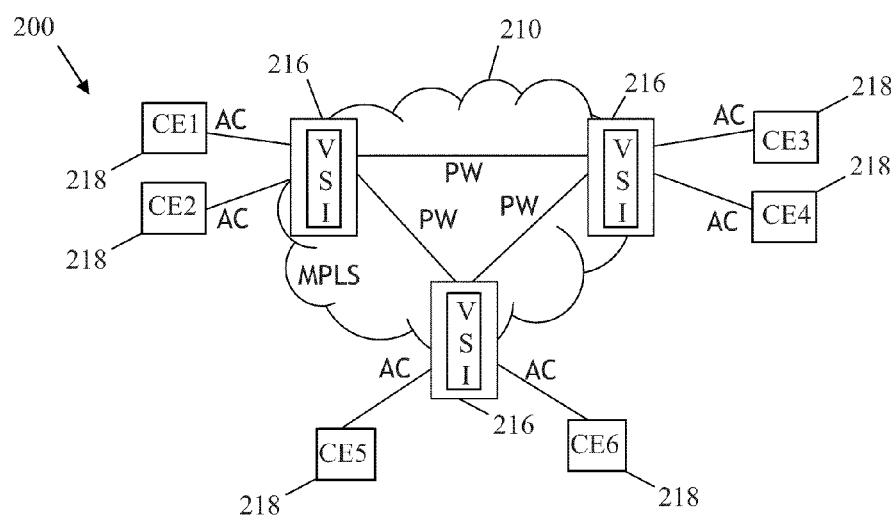
FIG. 2 is a schematic diagram of an embodiment of a VPLS.

FIG. 2 illustrates an embodiment of a VPLS 200 in a Multiprotocol Label Switching (MPLS) network domain 210. The MPLS network domain 210 may be one of a plurality of domains in a MPLS network. The VPLS 200 may emulate an E-LAN functionality in standard Ethernet networks among customer edge (CE) devices, such as a Layer 2 Virtual Private Network (L2VPN) service that provides multipoint-to-multipoint connectivity for Ethernet across an Internet Protocol (IP) or a MPLS-enabled IP packet switched network. The emulated E-LAN functionality may be achieved in the MPLS network domain 210 as described in the Internet Engineering Task Force (IETF) Request for Comments (RFC) 4761 and RFC 4762, which are incorporated herein by reference.

The MPLS network domain 210 may comprise a plurality of PEs 216 that may each comprise a corresponding VSI. Each pair of VSIs in the PEs 216 may is be coupled together via a PW, which may be used to transport frames between the VSIs. The VSIs also may be coupled to one or more CEs 218 (e.g. CE1, CE2, CE3, CE4, CE5, and CE6). The CEs 218 may be located outside the MPLS network domain 210, such as in one or more separate networks or domains and/or at customer sites. Each VSI may be coupled to one or more CEs 218 via an Ethernet interface or a virtual Ethernet interface, referred to herein as an attachment circuit (AC). The ACs may be used to transport Ethernet frames between the VSIs and the corresponding CEs 218.

The PEs 216 (and/or PEs in FIG. 1) may be network nodes, devices, or components that support transportation of frames and/or packets through the MPLS network domain 210 (and/or the Ethernet bridged network domain 110). For example, the PEs 216 may include bridges, switches, routers, or various combinations of such devices. The PEs 216 may comprise a plurality of ingress ports for receiving frames and/or packets from other nodes, logic circuitry that determines which nodes to send the frames and/or packets to, and a plurality of egress ports for transmitting frames and/or packets to the other nodes. In an embodiment, the PEs 216 may be label edge routers (LERs) that are configured to add or remove the labels of the frames and/or packets transported between the MPLS network domain 210 and external networks. The CEs 218 may be network nodes, devices, or components configured similar to the PEs 216, but may be located outside the MPLS network domain 210. For instance, the CEs 218 may be customer sites or devices or may be coupled to customer sites or devices.

The VPLS 200 and the MPLS network domain 210 may support an E-Tree service to transfer frames over the PWs between the VSIs, for instance using MAC-based forwarding. Some solutions for supporting E-Tree services in MPLS/VPLS based networks have been proposed to the IETF Pseudowire Emulation Edge to Edge version 3 (PWE3) workgroup (WG) and the L2VPN WG, such as discussed in the IETF documents draft-key-l2vpn-etree-frwk-04 (E-Tree-Frwk), draft-key-l2vpn-vpls-etree-02 (VPLS-E-Tree), and draft-simon-pwe3-cw-bit-01 (CW-LBit), all of which are incorporated herein by reference.

Figure 3:
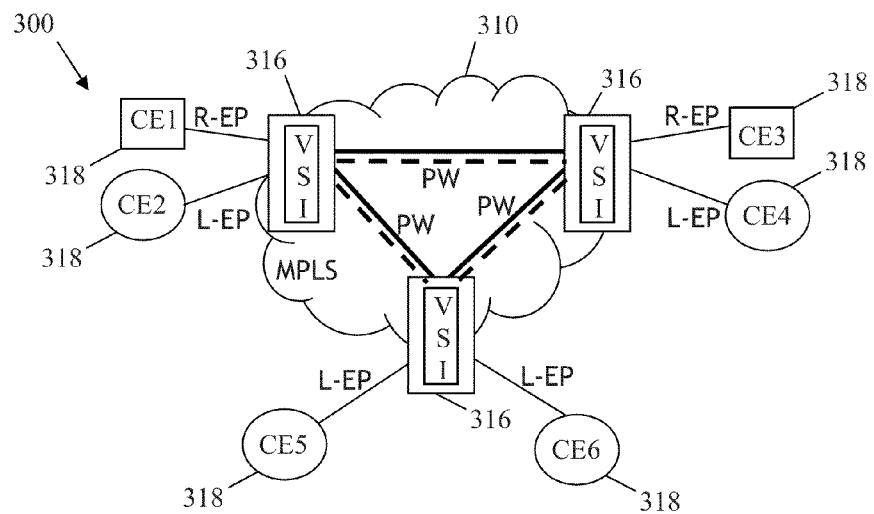
FIG. 3 is a schematic diagram of an embodiment of a VPLS based E-Tree.

FIG. 3 illustrates another embodiment of a VPLS based E-Tree 300 in a MPLS network domain 310. The MPLS network domain 310 may comprise a plurality of PEs 316 that may each comprise a corresponding VSI. Each pair of VSIs in the PEs 216 may be coupled together via a PW, which may be used to transport frames between the pair of VSIs. The VSIs also may be coupled to one or more CEs 318 (e.g. CE1, CE2, CE3, CE4, CE5, and CE6), which may be located outside the MPLS network domain 310. Each VSI also may be coupled to one or more CEs 218 via an Ethernet interface or a virtual Ethernet Interface (e.g. an AC), which may be used to transport Ethernet frames between the VSIs and the corresponding CEs 218. The PEs 316 and the CEs 318 may be configured similar to the PEs 216 and the CEs 218, respectively.

The CEs 318 may be associated with the VPLS based E-Tree 300, where each of the CEs 318 may be a root CE (represented by a rectangle) or a leaf CE (represented by an oval). A root CE coupled to a first PE 316 may exchange data frames with another root CE and/or a leaf CE coupled to a second PE 316 via a corresponding PW and corresponding ACs. A first VSI in the first PE 316 may comprise a root end point (e.g. a first root port at the first PE 316) that is coupled to a root CE. The first VSI also may be coupled to a second VSI at the second PE 316 that comprises another root end point (e.g. a second root port at the second PE 316), a leaf end point (e.g. a leaf port at the second PE 316), or both. For example, CE1 may be a root CE that exchanges packets or frames with another root CE, CE3, and with any one of the leaf CEs, CE4, CE5, and CE6. Similarly, CE3 may be another root CE that exchanges root Ethernet packets with CE1 and with any one of CEs, CE4, CE5, and CE6. A leaf CE coupled to a first PE 316 may exchange data frames with a root CE coupled to a second PE 316, but not with another leaf CE. For example, CE2 may be a leaf CE that exchanges packets or frames with CE3 only, but not with CE4, CE5, and CE6. Similarly, each one of CE4, CE5, and CE6 may exchanges data frames with CE1, CE2, and/or CE3 but not with the other leaf CEs.

In FIG. 3, the frames sent from the root CEs are indicated as root Ethernet frames (R-EP), and the frames sent from the leaf CEs are indicated as leaf Ethernet frames (L-EP). Each of the PEs 316 may be configured with a root or leaf attribute. As such, the PEs 316 or the VSIs at the PEs 316 may receive the frames from the CEs 318 and add different tags to the frames before forwarding the frames to other PEs 316. A PE 316 may be a root PE that adds root tags to the frames sent from a root CE or may be a leaf PE that adds leaf tags to the frames sent from a leaf CE before forwarding the frames to other PEs 316. The tags in the frames may allow the other PEs 316 to differentiate between the frames sent from root CEs and the frames sent from leaf CEs. Thus, the tags in the frames allow the PEs 316 to forward the frames properly according to the E-Tree service rules and according to the MAC addresses in the frames. The PEs 316 also may remove the tags from the frames before forwarding the frames to the destination CEs (root or leaf CEs).

In some scenarios, the E-Tree service in the MPLS network domain 210 may extend across multiple domains or networks, which may be coupled to one another, such as the MPLS network domain 210, the Ethernet Bridged Network 110, and/or other networks or domains. To implement the E-Tree services in each of the domains or networks, one domain may use an IEEE 802.1 scheme and another domain may use an IETF MPLS/VPLS scheme. For example, the E-Tree service may be implemented in a MPLS network domain similar to the VPLS based E-Tree 300 and in a MEN coupled to the MPLS network domain similar to the E-Tree service 100.

The domains and/or networks may be coupled to each other via one or more network to network interfaces (NNIs), where each NNI may comprise two end points at two coupled domains or networks. Implementing the E-Tree service rules at the NNIs between the different networks or domains may be difficult since the root and leaf attributes may not be supported at the NNI's end points between the domains. Typically, an end point of the NNI (e.g. a first EP) at a first domain may remove the root or leaf tag before forwarding the frame to a second domain, e.g. at an external network. When the forwarded frame arrives at the other end point (e.g. a second EP) of the NNI, the other end point may not be able to determine whether the frame is sent from a leaf or root source. Thus, the frame may not be forwarded properly using the E-Tree service at the second domain.

Disclosed herein is a system and method for supporting an E-Tree service across multiple networks or domains. The system may comprise a NNI end point configured to support root and leaf attributes across the domains or networks. The end point may be associated with an E-Tree service that extends the domains and may be configured with a trunk attribute. The trunk end point may be a PE that is used for interconnecting two similar or different domains, such as a MEN and MPLS/VPLS network domain. The trunk end point may translate the root and leaf tags in the frames before forwarding the frames and/or after receiving frames via a NNI. Thus, the PEs at a destination domain may be able to distinguish whether the frames are sent from a root or leaf source, and may properly forward the frames in the E-Tree service at the destination domain. Also disclosed is a system that supports an E-Tree service in a Hierarchical VPLS (H-VPLS) configuration. The system may comprise a bridge capable device that is configured with a trunk attribute similar to a trunk end point in the NNI.

Figure 4:
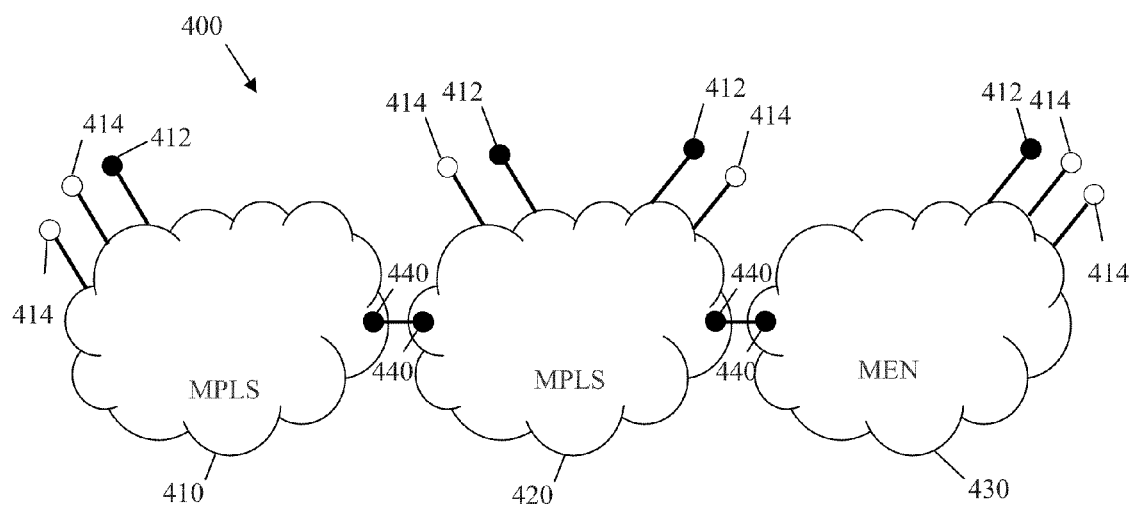
FIG. 4 is a schematic diagram of an embodiment of an E-Tree service across a plurality of network domains.

FIG. 4 illustrates an embodiment of an E-Tree service 400 across a plurality of network domains. For instance, the E-Tree service 400 may extend across a first MPLS network domain 410, a second MPLS network domain 420, and a MEN 430. The first MPLS network domain 410 may be coupled to the second MPLS network domain 420 via a first NNI, and the second MPLS network domain 420 may be coupled to the MEN 430 via a second NNI. Each one of the first MPLS network domain 410, second MPLS network domain 420, and MEN 430 may comprise a plurality of PEs (not shown) that may be coupled to a plurality of root CEs 412 and/or leaf CEs 414. The PEs coupled to the root CEs 412 may have root attributes (represented by filled circles and referred to as root PEs), and the PEs coupled to the leaf CEs 414 may have leaf attributes (represented by hollow circles and referred to as leaf PEs). Each NNI also may comprise two end points 440, e.g. PEs, which may have trunk attributes.

Since each domain may use different tags to represent root frames and leaf frames within the domain, at least one trunk end point 440 for each NNI may be configured to perform tag mapping or translation between the two corresponding domains. The trunk end point 440 may be aware of the root and leaf tags used in the ingress domain and the root and leaf tags used at the NNI or the egress domain. For instance, when the trunk end point 440 receives a frame from the ingress domain, the trunk end point 440 may detect the tag in the frame. If the tag is a root tag, then the trunk end point 440 may remove the root tag from the frame and add another root tag that is used at the NNI before forwarding the frame via the NNI. If the tag is a leaf tag, then the trunk end point 440 may remove the leaf tag from the frame and add another leaf tag that is used at the NNI before forwarding the frame via the NNI. When the corresponding trunk end point 440 at the other end of the NNI receives the frame, the receiving trunk end point 440 may remove the root tag or leaf tag that is used at the NNI and add a corresponding root tag or leaf tag that is used at the egress domain. Thus, the PEs or nodes in the egress domain may recognize the root or leaf tag in the frame and forward the frame properly in the egress domain using the E-Tree service.

Mapping the domain's root and leaf tags into the NNI's root and leaf tags may allow each of the domains associated with the NNI to use the domain's own root and leaf tags without sharing the root and leaf tag information with the other domain, which improves network security. The NNI's root and leaf tags may be independent and different from the root and leaf tags used in the ingress and egress domains. In other embodiments, the NNI's root and leaf tags also may be used in the ingress domain or the egress domain. For instance, one or both trunk end points 440 may perform tag translation on ingress traffic, e.g. before forwarding a frame to an egress domain, on egress traffic, e.g. after receiving a frame from an ingress domain, or both. Alternatively, both trunk end points 440 may perform tag translation on ingress traffic only or egress traffic only.

In some cases where a domain comprises only leaf end points or leaf CEs 414 and is coupled to a single domain via a single NNI, such as the MEN 430, the trunk end point 440 at the domain may perform traffic optimization by not allowing frames that comprise leaf tags onto the domain. Thus, leaf-to-leaf communications may be prevented in the E-Tree service. The leaf tagged frames may be blocked at the trunk end point 440 at the egress domain (e.g. the MEN 430) or at the corresponding trunk end point 440 at the ingress domain (e.g. the second MPLS network domain 420). In the case where a domain comprises only leaf CEs 414 and is coupled to a plurality of domains via a plurality of NNIs, such as the second MPLS network domain 420, the trunk end point 440 at the domain may allow frames that comprise leaf tags onto the domain. The leaf tagged frames may be allowed to pass through the domain and may then be delivered to a destination domain that comprises a root CE 412 (e.g. the MEN 430). The trunk end point 440 may use a signaling protocol to inform other PEs in the domain to pass through the leaf tagged frames.

Additionally, the trunk end point 440 may be configured to translate the data information in the frames between the two associated domains since each domain may use a different transport technology, such as the second MPLS network domain 420 and the MEN 430. For example, the end point 440 may be configured by the operator to properly decapsulate and encapsulate the data in the frames between the two domains while forwarding the frames using the same E-Tree service across the domains. If the trunk end point 440 receives a frame that comprises an unknown tag, e.g. that is not recognized as a root or leaf tag, then the trunk end point 440 may discard the frame and inform the operator. In another embodiment, an edge router or a PE may be directly coupled to two domains or networks, e.g. instead of the NNI. Similar to the trunk end point 440, the edge router may be configured to perform tag translation in the frame between the two domains before forwarding the frame from the ingress domain to the egress domain.

Figure 5:
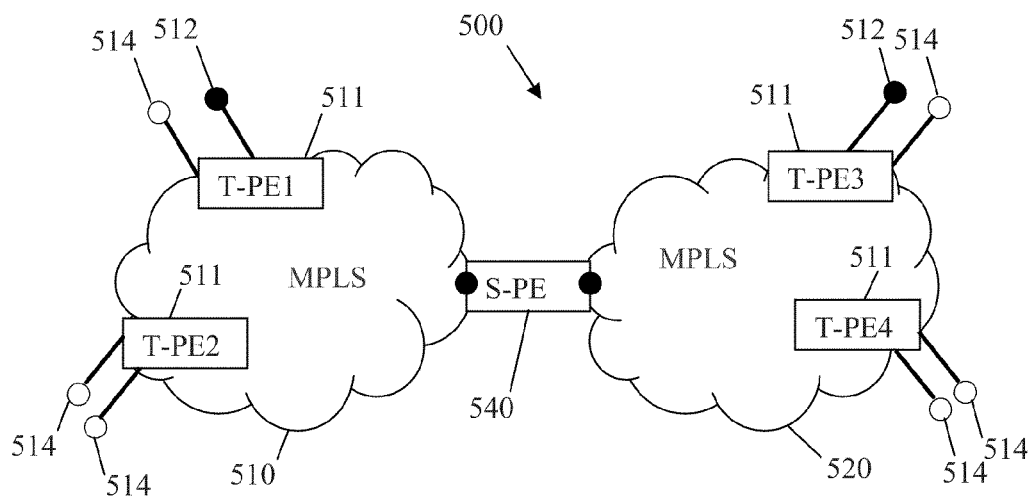
FIG. 5 is a schematic diagram of another embodiment of an E-Tree service across a plurality of network domains.

When an E-Tree spans across multiple domains, each domain may use different tags to indicate root tagged frames and leaf tagged frames, as described above. If two domains belong to the same operator, Label Distribution Protocol (LDP) signaling or Border Gateway Protocol (BGP) signaling may be used to exchange the root and leaf tag information between the two domains, and hence negotiate which trunk end point(s) may be used for tag translation. FIG. 5 illustrates one embodiment of an E-Tree service 500 across multiple domains. The E-Tree service 500 may extend across a first MPLS network domain 510 and a second MPLS network domain 520, which may be coupled to each other via a switching PE (S-PE) 540. The S-PE 540 may comprise a trunk end point at each of the two domains, which may be configured similar to the trunk end points described above. Each one of the first MPLS network domain 510 and the second MPLS network domain 520 may comprise a plurality of terminating PEs (T-PEs) 511 (e.g. T-PE1, T-PE2, T-PE3, and T-PE4) that may be coupled to a plurality of root CEs 512 and/or leaf CEs 514. The T-PEs 511 coupled to the root CEs 512 may have root attributes (represented by filled circles and referred to as root PEs), and the T-PEs 511 coupled to the leaf CEs 514 may have leaf attributes (represented by hollow circles and referred to as leaf PEs). Some of the T-PEs 511 may only be coupled to leaf CEs 514, such as T-PE2 and T-PE4.

Each MPLS domain may use different tags to represent the root tagged frames and the leaf tagged frames. Thus, the S-PE 540 may perform tag translation in the frame forwarding process between the two domains. When using LDP to configure the E-Tree service, each domain may signals its tags to the S-PE 540, which may then perform tag translation at the data plane. When using BGP, a router reflector (not shown) may be used at the S-PE 540 according to RFC 4456, which is incorporated herein by reference. The router reflector (RR) may be configured to receive the root and leaf tag information from a first T-PE 511 in one domain, e.g. T-PE1, and may then pass the same tag values to a second T-PE 511, e.g. T-PE3, in the other domain. Alternatively, the RR may change the tag values before sending the tag information to the second T-PE 511. In this case, the S-PE 540 may perform tag translation in the frame forwarding process between the two domains.

Figure 6:
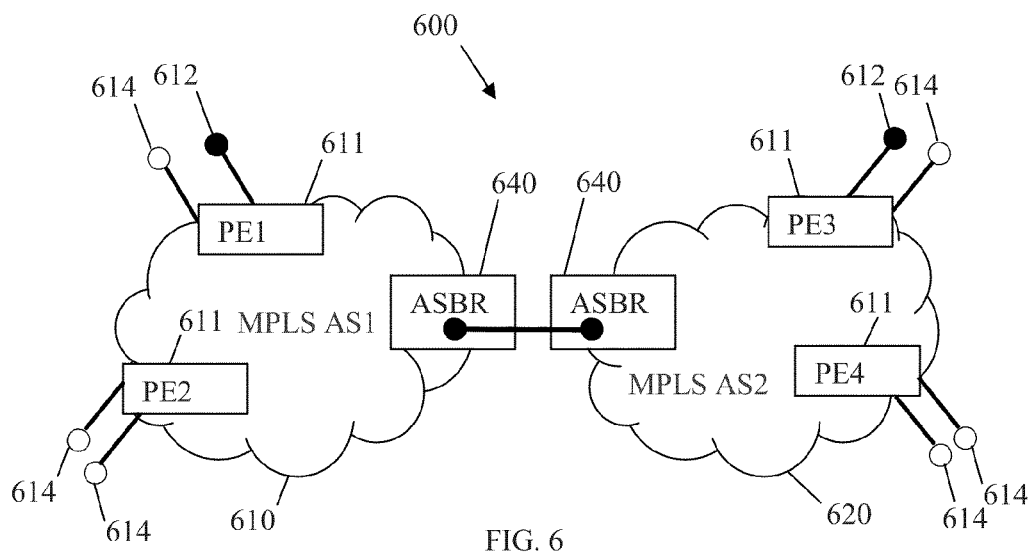
FIG. 6 is a schematic diagram of another embodiment of an E-Tree service across a plurality of network domains.

FIG. 6 illustrates another embodiment of an E-Tree service 600 across multiple domains. The E-Tree service 600 may extend across a first MPLS Autonomous System (AS) domain 610 and a second MPLS AS domain 620, which may be coupled to each other via an external interface. Each of the first MPLS AS domain 610 and the second MPLS AS domain 620 may comprise a plurality of PEs 611 (e.g. PE1, PE2, PE3, and PE4) that may be coupled to a plurality of root CEs 612 and/or leaf CEs 614. The PEs 611 coupled to the root CEs 612 may have root attributes (represented by filled circles and referred to as root PEs), and the PEs 611 coupled to the leaf CEs 614 may have leaf attributes (represented by hollow circles and referred to as leaf PEs). Some of the PEs 611 may only be coupled to leaf CEs 614, such as PE2 and PE4. Each of the first MPLS AS domain 610 and the second MPLS AS domain 620 also may comprise an Autonomous System Boundary Router (ASBR) 640.

The ASBRs 640 may be coupled to each other to establish a trunk between the two domains. As such, each ASBR 640 may be a trunk end point on opposite sides and may be configured similar to the trunk end points above. The ASBRs 640 may use external BGP (EBGP) to communicate the root and leaf tags between each other and perform tag translation during the frame forwarding process. If a PE 611 is only coupled to leaf CEs 614 in one domain, such as PE2 or PE4, the ASBR 640 in the domain may inform the second ASBR 640 in the second domain about the PE 611 status. Thus, the second ASBR 640 may not forward from the second domain any leaf tagged frames that are destined to that PE 611, which may save network resources.

Figure 7:
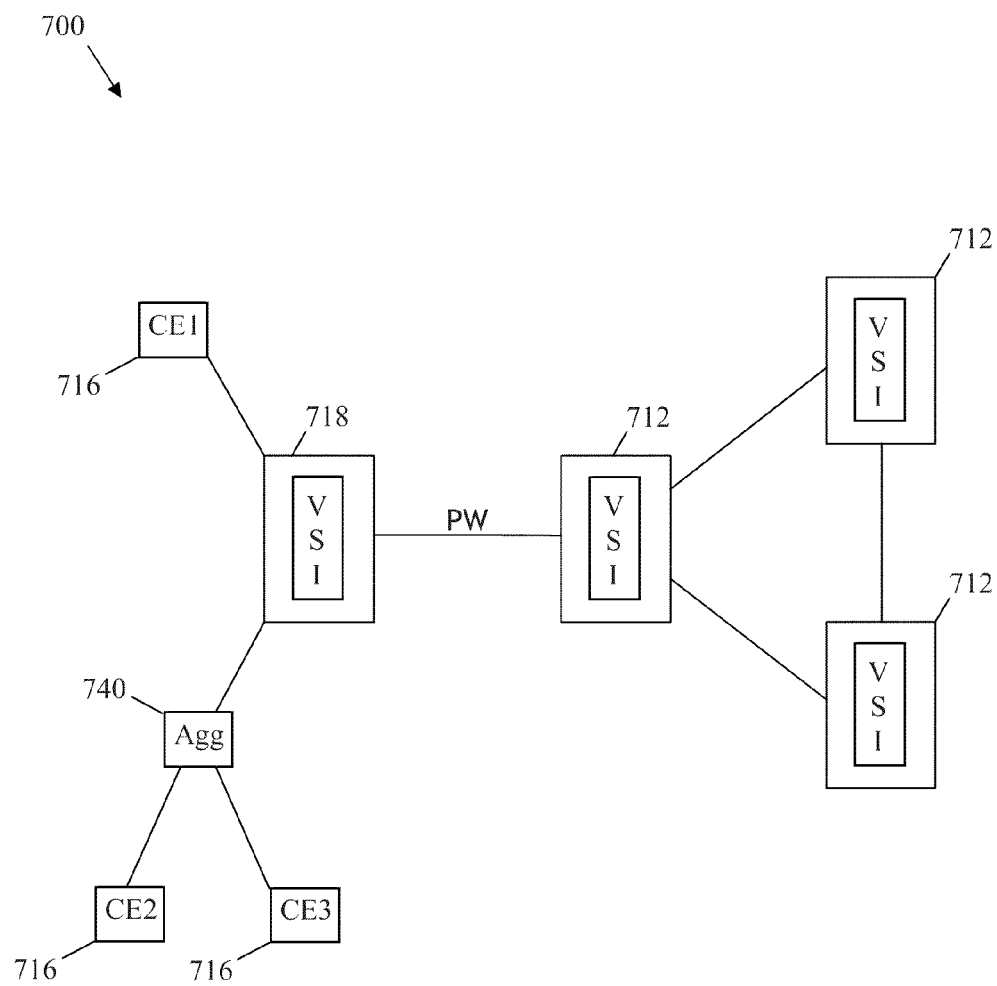
FIG. 7 is a schematic diagram of an embodiment of a Hierarchical VPLS (H-VPLS) configuration.

A tag translation scheme similar to the tag translation scheme for E-Tree services across multiple domains may be implemented in an H-VPLS configuration, where a PE in a network domain may be coupled to a plurality of CEs via a switching device. FIG. 7 illustrates an embodiment of an H-VPLS configuration 700 that uses a bridge capable device, such as a Multi-Tenant Unit switch (MTU-s). The H-VPLS configuration 700 may comprise a plurality of PEs 712 that may be located in the same domain (e.g. a MPLS network domain) and a MTU-s 718 that may be coupled to one of the PEs 712, e.g. outside the domain. Each of the PEs 712 and the MTU-s 718 may comprise a VSI that may be associated with the same E-Tree service. Each pair of PEs 712 may be coupled to each other via a PW, referred to herein as a hub PW, and the MTU-s 718 may be coupled to one of the PEs 712 via an additional PW, referred to herein as a spoke PW. The H-VPLS configuration 700 also may comprise a plurality of CEs 716 that may be coupled to the MTU-s 718 via an AC, such as CE1, or via an aggregate node 740 and multiple ACs, such as CE2 and CE3.

The MTU-s 718 may be a bridge capable device that is configured to distinguish between the root tagged frames and the leaf tagged frames from the CEs 716, process the tags in the frames, and forward the frames accordingly via the spoke PW. The MTU-s 718 also may receive leaf tagged frames and root tagged frames from the PE 712 via the spoke PW, process the frames, and forward the frames to the destination CEs 716 according to the MAC addresses in the frames. The spoke PW between the PE 712 and the MTU-s 718 may be configured as an intra NNI, where a first trunk end point may be located at the PE 712 and a second trunk end point may be located at the MTU-s 718. The first and second trunk end points may be configured similar to the trunk end point 440, and as such may perform tag translation in the frames forwarded between the PE 712 and the CEs 716 as described above. If the PEs' domain (e.g. MPLS network domain) and the MTU-s 718 use the same tagging scheme (same root and leaf tags), then the trunk end points may not need to perform tag translation to forward the frames between the CEs 716 and the PEs 712.

In some embodiments, the multi domain E-Tree service model or the H-VPLS model may be implemented on one provider edge device, e.g. a PE. In this case, a Multi-Tenant Unit (MTU) module may reside on the PE. Additionally, the PE may be coupled to a peer PE that comprises a second MTU module. The PE and similarly the peer PE may comprise a Customer VLAN (C-VLAN) bridge and a Service VLAN (S-VLAN) bridge (that correspond to the MTU module) and a VSI, and may be coupled to a plurality of roots, leaves, or both. The PE and the peer PE may be coupled via a PW that serves as a trunk link between the two PEs. Each MTU module may have one trunk end point. The MTU modules on the different PEs may use different tag values for root and leaf frame indication. As such, the tag translation described above may be implemented on each PE. For instance, if a frame with a remote VLAN leaf tag is received at the PE or the peer PE via the PW, then the remote VLAN leaf tag is mapped to a local VLAN leaf tag. Similarly, if a frame with a remote VLAN root tag is received at the PE or the peer PE via the PW, then the remote VLAN root tag is mapped to a local VLAN root tag. In other words, at the PE where a frame exits the PW, if a frame with the remote leaf tag is received, then it is mapped to the local leaf tag; otherwise, if a frame with the remote root tag is received, then it is mapped to the local root tag, wherein packets over both remote and local VLANs are processed in the same customer MAC space and are further forwarded or dropped in the exit bridge module using the mechanism as described in IEEE 802.1Q.

Figure 8:
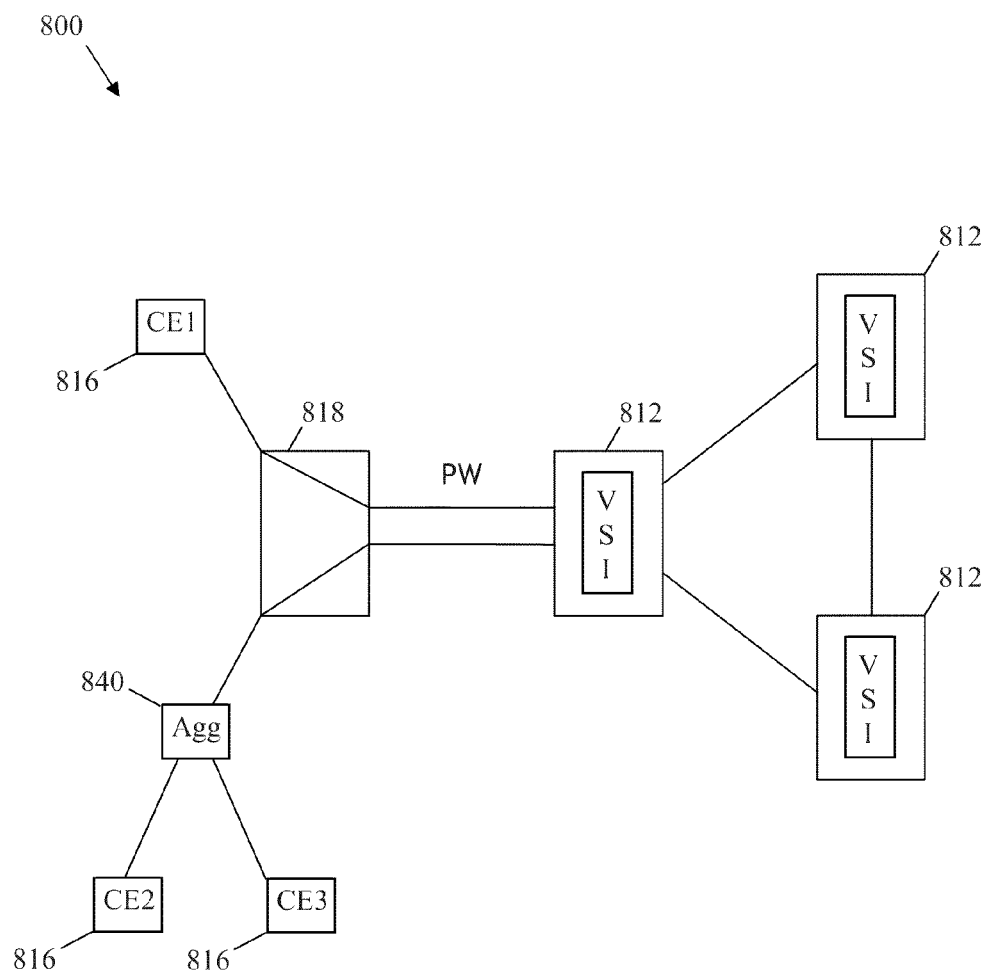
FIG. 8 is a schematic diagram of another embodiment of an H-VPLS configuration.

FIG. 8 illustrates another embodiment of an H-VPLS configuration 800 that does not use a bridge capable device on the customer side. The H-VPLS configuration 800 may comprise a plurality of PEs 812 that may be located in the same domain, e.g. in a core service network, and a PE switch (PE-s) 818 that may be coupled to one of the PEs 812 outside the domain. Each of the PEs 812 may comprise a VSI that may be associated with the same E-Tree service. Each pair of PEs 812 may be coupled to each other via a hub PW and the PE-s 818 may be coupled to one of the PEs 812 via one or more spoke PWs. The H-VPLS configuration 800 also may comprise a plurality of CEs 816 that may be coupled to the PE-s 818 directly, such as CE1, or via an aggregate node 840, such as CE2 and CE3.

The PE-s 818 may be a Layer 2 switch that is configured to extend a spoke PW from each port coupled to a CE 816 or the aggregate node 840 to one PE 812 in the core service network. The ports at the PE-s 818 may be coupled to the CE 816 and the aggregate node 840 via corresponding ACs. The PE 812 may be a bridging VPLS PE router that forwards traffic over the hub PWs, e.g. using MAC-based forwarding. Accordingly, each CE 816 or aggregate node 840 may be coupled to the VSI in the PE 812 via a corresponding spoke PW, where the data frames may be transported without learning or replication at the PE-s 818. For instance, the PE-s 818 may forward the traffic received on the ACs and the corresponding ports to the corresponding spoke PWs without processing. Similarly, the PE-s 818 may forward the traffic received on the spoke PWs to the corresponding ports and ACs without processing. To support the E-tree service, the spoke PW associated with each port may be assigned a root attribute (associated with a root AC) or a leaf attribute (associated with a leaf AC). Thus, the PE 812 coupled to the spoke PWs may distinguish between the frames sent from a root source or a leaf source and forward the frames properly in the domain using the E-Tree service.

In the schemes above, a PE may need to detect the frames received on a NNI or a spoke PW and perform tag addition to the frames before forwarding the frames to other PEs. The PEs also may need to announce its capability to perform E-Tree functions to the other PEs or nodes to ensure proper forwarding of the frames in the E-Tree service. For instance, the PEs may announce E-Tree capability via LDP signaling as defined in RFC 5561, BGP signaling as defined in RFC 5492, both of which are incorporated herein by reference, or other signaling protocol using a capability parameter TLV.

Figure 9:
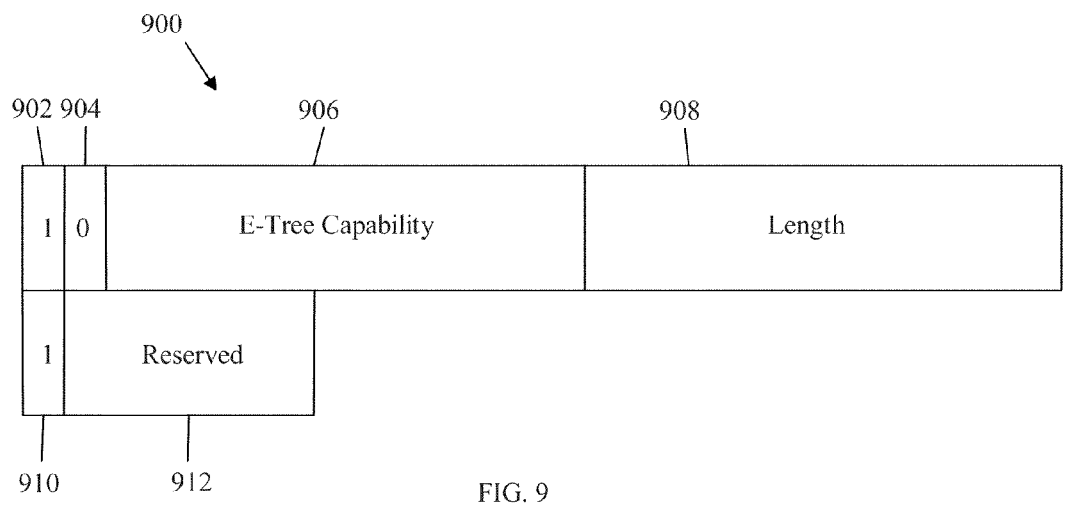
FIG. 9 is a schematic diagram of an embodiment of a capability parameter Type-Length-Value (TLV).

FIG. 9 illustrates an embodiment of a capability parameter TLV 900 that may be used in the LDP signaling protocol, the BGP signaling protocol, or other signaling protocols. For instance, a PE may advertise the capability parameter TLV 900 in a LDP Initialization message to other PEs to indicate whether the PE supports the procedures for E-Tree setup. The PE may advertise its E-Tree capability explicitly by sending the capability parameter TLV 900 to the other PEs and indicating in the capability parameter TLV 900 whether the PE supports the E-Tree capability or does not support the E-Tree capability. If a PE does not support E-Tree capability, the PE may only connect to a root CE and ignore the signal message from a remote PE. The remote PE that supports E-Tree capability and does not receive an E-Tree capability message from a peer PE may remove the tag from a received frame before sending the frame to the PE that does not support E-Tree capability. In another embodiment, the PE may advertise the capability parameter TLV 900 explicitly or implicitly in a BGP Capabilities Optional Parameter as defined in section 4 of RFC 5492.

The capability parameter TLV 900 may comprise an E-Tree capability field 906, a Length field 908, and a reserved field 912. The E-Tree capability field 906 may comprise a capability code that may be set to indicate that the PE supports the E-Tree capability or may not be set if the PE does not support the E-Tree capability. The capability code may be assigned by the Internet Assigned Numbers Authority (IANA). The Length field 908 may indicate the length of the capability parameter TLV 900, e.g. in bytes. The Reserved field 912 may be reserved and may not be used. The capability parameter TLV 900 also may comprise a first bit 902 that may be set to about one (e.g. to indicate unknown), a second bit 904 that may be set to about zero (e.g. to indicate non transitive), and a third bit 910 that may be set to about 1 to indicate E-Tree support or to about zero to indicate no E-Tree support.

Figure 10:
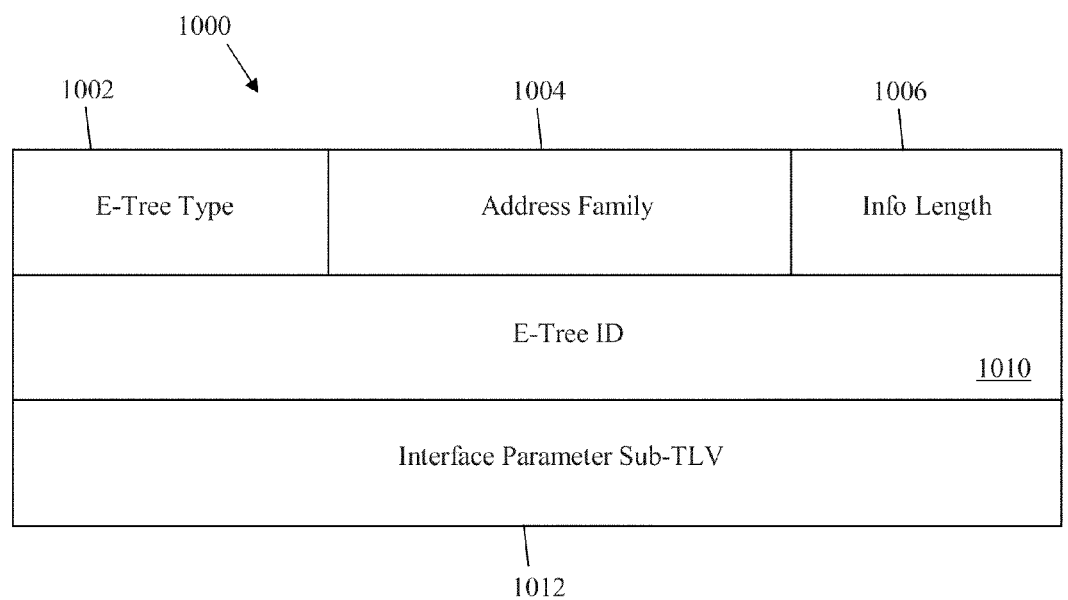
FIG. 10 is a schematic diagram of an embodiment of a forward error correction (FEC) TLV.

FIG. 10 illustrates an embodiment of a FEC TLV 1000 that may be used according to the LDP signaling protocol, e.g. to setup a MPLS Label Switched Path (LSP). The FEC TLV 1000 may be used to advertise an E-Tree (or MPLS) FEC element. The FEC TLV 1000 may comprise an E-Tree Type field 1002, an Address Family field 1004, an Information (Info) Length field 1006, an E-Tree Identifier (ID) field 1010, and an Interface Parameter sub-TLV 1012. The E-Tree Type field 1002 may comprise a value that that represents the type of the E-Tree and may have a length of about 15 bits. The Address Family field 1004 may comprise a value from the ADDRESS FAMILY NUMBER in RFC 3036, which is incorporated herein by reference, which encodes the address family for the E-Tree ID. The Address Family field 1004 may have a length of about two octets. The E-Tree ID field 1010 may comprise an E-Tree ID value that represents an E-Tree service instance that may be differentiated from other services. The E-Tree ID may be used as a virtual tunnel index and may have a length of about 32 bits. To simplify configuration, a sub-LSP ID of an ingress node may be used as part of the virtual tunnel for transport to an egress node. The Interface Parameter sub-TLV 1012 may be configured as described in RFC 4447, which is incorporated herein by reference.

Figure 11:
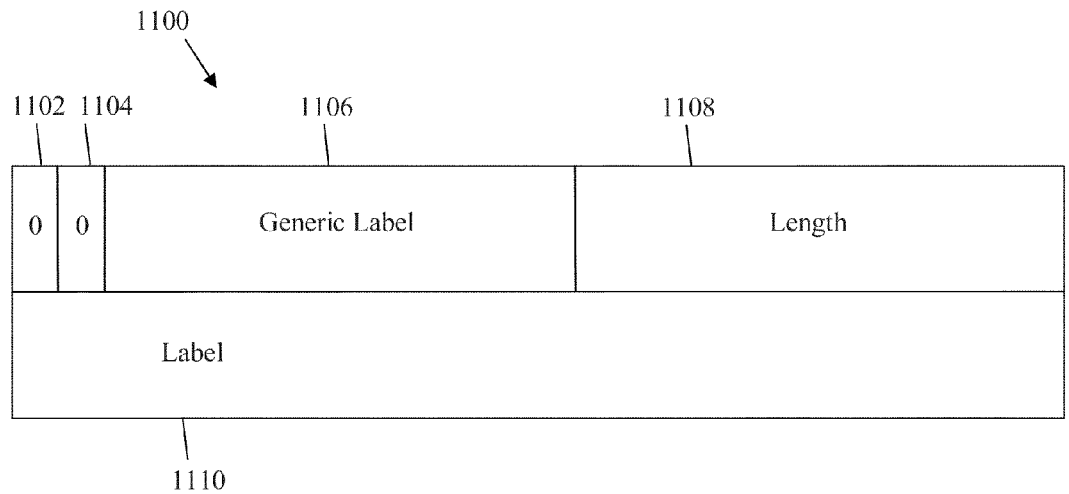
FIG. 11 is a schematic diagram of an embodiment of a generic label TLV.

FIG. 11 illustrates an embodiment of a generic label TLV 1100 that may be based on RFC 3036. A label switch router (LSR) may use the generic label TLV 1100 to encode labels for use on links for which the label values may be independent of the underlying link technology. Examples of such links include Point-to-Point Protocol (PPP) and Ethernet links. The generic label TLV 1100 may comprise a Generic Label field 1106, a Length field 1108, and a Label field 1110, which may be configured according to RFC 3036. The Label field 1110 may comprise a 20-bit number (label) in a four-octet field as specified in RFC 3036. The generic label TLV 1100 also may comprise a first bit 1102 and a second bit 1104 that may both be set to about zero.

Figure 12:
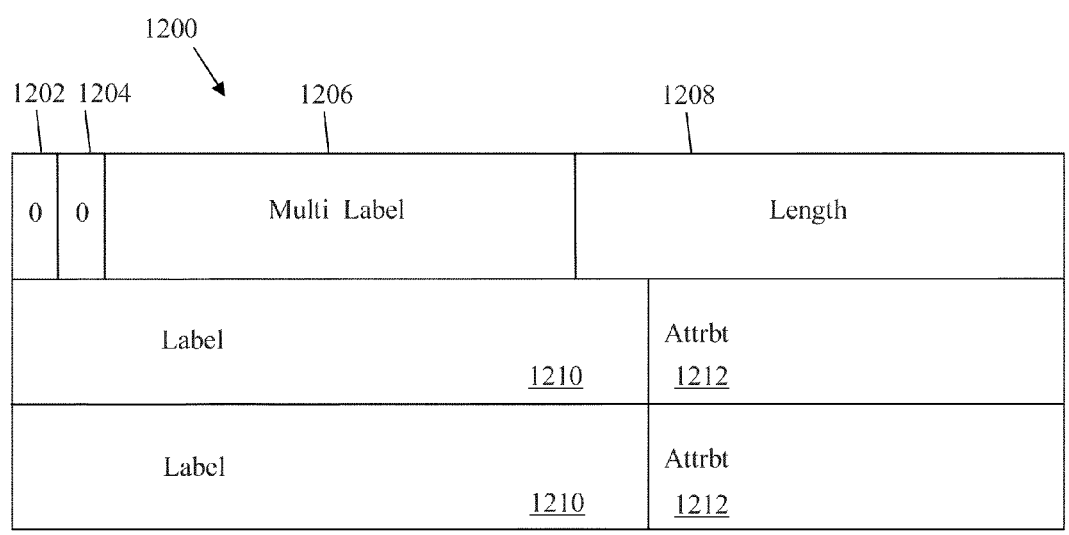
FIG. 12 is a schematic diagram of an embodiment of a multi label TLV.

FIG. 12 illustrates an embodiment of a multi label TLV 1200 that may be used to support an E-Tree service, e.g. in the LDP signaling protocol. The multi label TLV 1200 may be used to bind a LSP to a plurality of labels, which may each be associated with a corresponding attribute. For the E-Tree service, a PW may be associated with two PW labels: one for the root tagged frames and one for the leaf tagged frames. An egress PE may use the generic label TLV 1200 to indicate to an ingress PE a first label that may be associated with root tagged frames and a second label that may be associated with leaf tagged frames. The multi label TLV 1200 may comprise a first bit 1202, a second bit 1204, a multi Label field 1206, and a Length field 1208, which may be configured similar to the corresponding fields in the generic label TLV 1100.

Additionally, the multi label TLV 1200 may comprise a plurality of Label fields 1210 and a plurality of corresponding Attribute (Attrbt) fields 1212. Each Label field 1210 may comprise a 20-bit number (label) in a four-octet field as specified in RFC 3032. Each Attribute field 1212 may comprise about twelve bits and indicate that the corresponding label in the Label field 1210 has an attribute. Using bit based attributes may provide up to about 12 labels per a label switched path (LSP). For an E-Tree service, the multi label TLV 1200 may comprise about two Label fields 1210 that specify an E-Tree: a root label and a leaf label. In this case, a first Attribute field 1212 may comprise a first attribute value 0x8 that is associated with a root tagged frame and a second Attribute field 1212 may comprise a second attribute value 0x4 that is associated with a leaf tagged frame. An ingress PE may add the root label on the frames received from a root end point and the leaf label on the frames received from a leaf end point. The root label and the leaf label may be previously suggested by an egress PE using the generic label TLV 1200. In other embodiments, the quantity of Label field 1210 that specify the E-Tree in the multi label TLV 1200 may be extended to more than two. Code Points also may be used for attributes.

In the case of the BGP protocol, multiple labels may be supported for the same prefix as described in RFC 3107, which is incorporated herein by reference. However, the labels may not be associated with defined attributes. Thus, the four-bit attributes in the generic label TLV 1000 also may be used in the BGP signaling protocol to indicate that a first label is associated with root tagged frames and a second label is associated with leaf tagged frames.

In some embodiments, a plurality of fields may be used in the frame header to represent root and leaf tags. For example, a first VLAN tag may be added to the frame header to indicate a root tagged frame and a second VLAN tag may be added to indicate a leaf tagged frame. In this case, a LDP protocol sub-interface TLV, e.g. according to RFC 3036, may be used to communicate root and leaf tags between the PEs. In another scenario, a BGP protocol non-transitive path attribute, may be used to signal root and leaf tags, e.g. according to RFC 4271, which is incorporated herein by reference. The path attribute may comprise a triplet<attribute type, attribute length, attribute value>of variable length. Additionally, an Attribute Type Code may be assigned for E-Tree tags. The root tag and the leaf tag may be added in a path attributed value field and an attribute length may used to reflect the length of the attribute value. The BGP protocol non-transitive path attribute also may be used to signal a leaf only PE or a leaf only domain, which may allow other PEs or domains to perform traffic optimization as described above.

Figure 13:
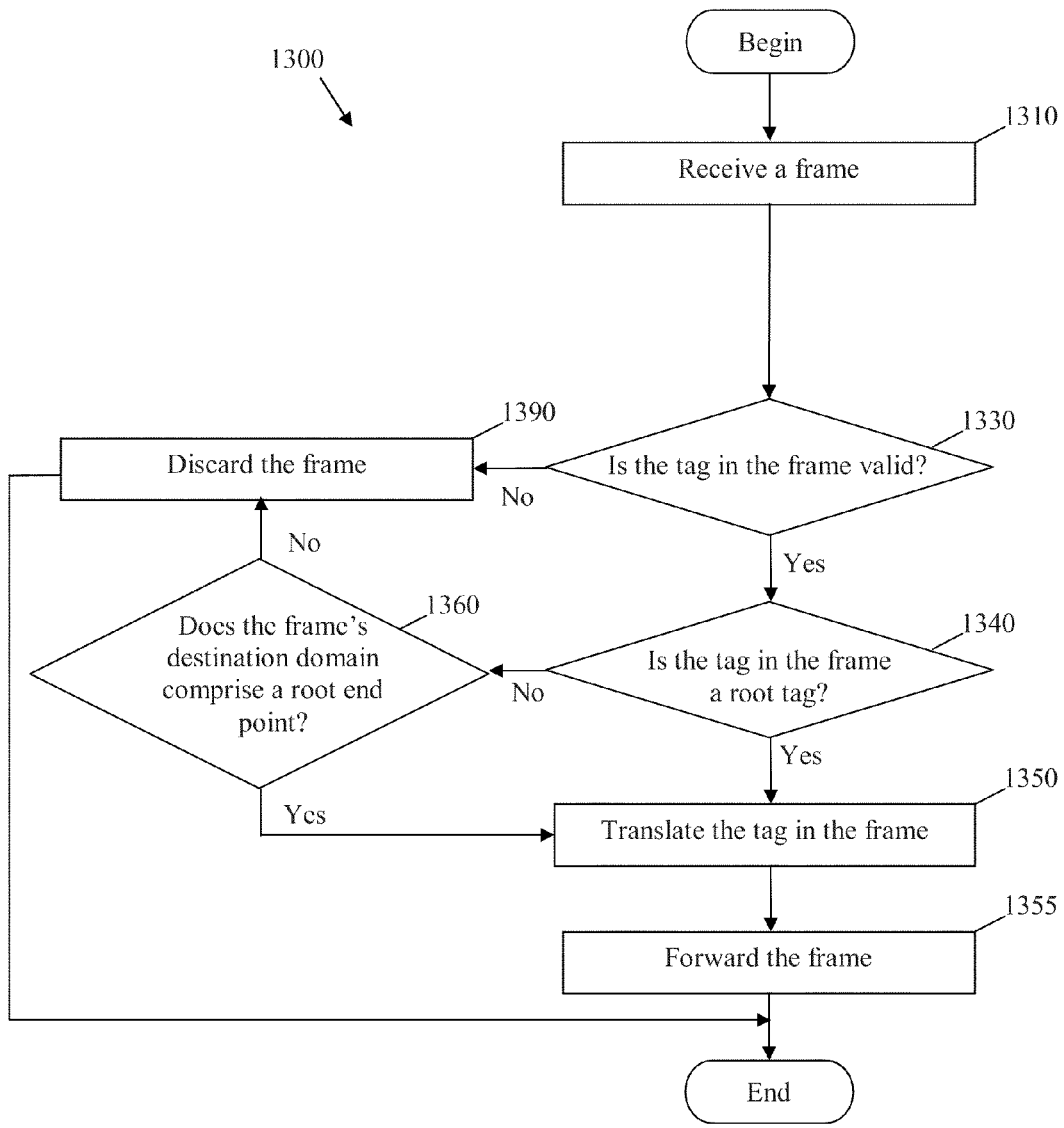
FIG. 13 is a flowchart of an embodiment of a frame service forwarding method.

FIG. 13 illustrates an embodiment of a frame forwarding method 1300, which may be implemented by an end point associated with an E-Tree service. For example, the frame forwarding method 1300 may be implemented by an end point 440, the S-PE 540, or an ASBR 640 in multiple domains scenarios or by the MTU-s 718 in an H-VPLS configuration scenario. The end point may be a trunk end point that has a trunk attribute and configured to perform tag translation, for instance between two domains or between a PE and a CE or aggregate node (in a HVPLS configuration).

The method 1300 may begin at block 1310, where a frame may be received. For example, in a multiple domain scenario, the end point 440 may receive a data frame from the first MPLS network domain 410 or the second MPLS network domain 420. In an H-VPLS configuration scenario, the MTU-s 718 may receive a data frame from a CE 716. The tag may be a root tag that indicates a root source (e.g. root CE 412) for the frame or a leaf tag that indicates a leaf source (e.g. leaf CE). At block 1330, the method 1300 may determine whether the tag in the frame is valid. For instance, the tag may not be valid if the end point does not recognize the tag as a root tag or a leaf tag. If the tag in the frame is valid, then the method 1300 may proceed to block 1340. Otherwise, the method 1300 may proceed to block 1390.

At block 1340, the method may determine whether the tag in the frame is a root tag. If the tag is a root tag then the method may proceed to block 1350. Otherwise, the tag may be a leaf tag, and the method 1300 may proceed to block 1360. At block 1350, the tag in the frame may be translated. For instance, the tag may be translated if the frame's destination domain uses different root and leaf tags than the frame's source domain. In some cases, the end point also may translate the frame's data or encapsulate the frames if the frame's destination domain uses a different network technology than the frame's source domain. At block 1355, the frame may be forwarded. For example, the end point may forward the frame from a first domain to a second destination domain or from an external CE to a PE in a network domain to the external CE.

At block 1360, the method 1300 may verify whether the frame's destination domain comprises a root end point. If the condition in block 1360 is true, such as if the destination domain comprises only leaf end points, then the method 1300 may proceed to block 1350. Otherwise, the method may proceed to block 1390. At block 1390, the frame may be discarded, e.g. to prevent leaf-to-leaf communications in the E-Tree service. The method 1300 may then end. In other embodiments, such as when the frame's source and destination domains use the same tags or when the forwarding end point is a switch that forwards leaf tagged frames and root tagged frames on separate PWs, the frame may be forwarded without processing the frame's tag and without tag translation.

Figure 14:
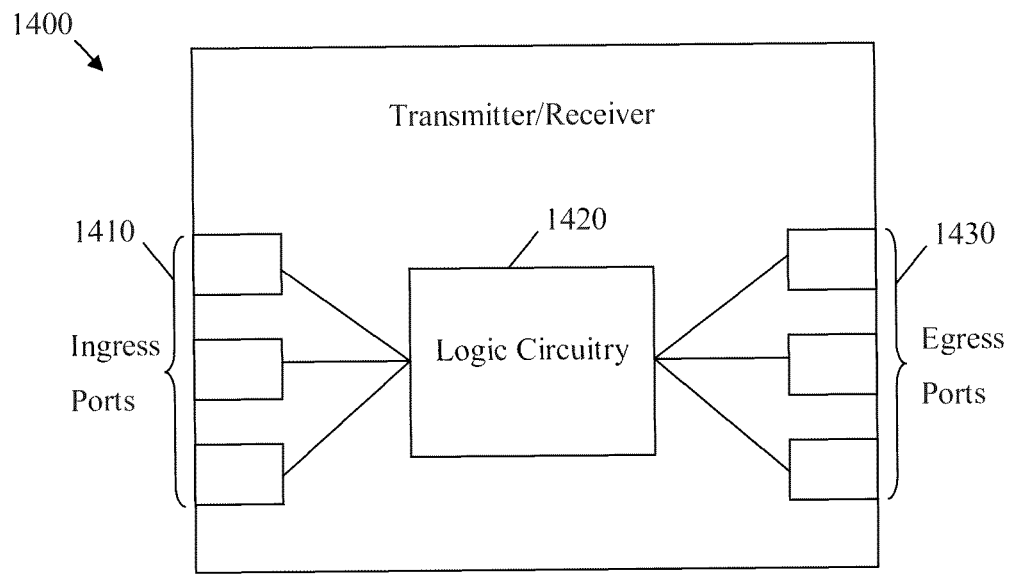
FIG. 14 is a schematic diagram of an embodiment of a transmitter/receiver unit.

FIG. 14 illustrates an embodiment of a transmitter/receiver unit 1400, which may be located at or coupled to any of the components described above. The transmitter/receiver unit 1400 may be any device that transports data through the network. For instance, the transmitter/receiver unit 1400 may correspond to or may be located in a PE, a CE, an end point, or any node described above. The transmitter/receiver unit 1400 may comprise a plurality of ingress ports or units 1410 for receiving frames, objects, or TLVs from other nodes, logic circuitry 1420 to determine which nodes to send the frames to, and a plurality of egress ports or units 1430 for transmitting frames to the other nodes.

Figure 15:
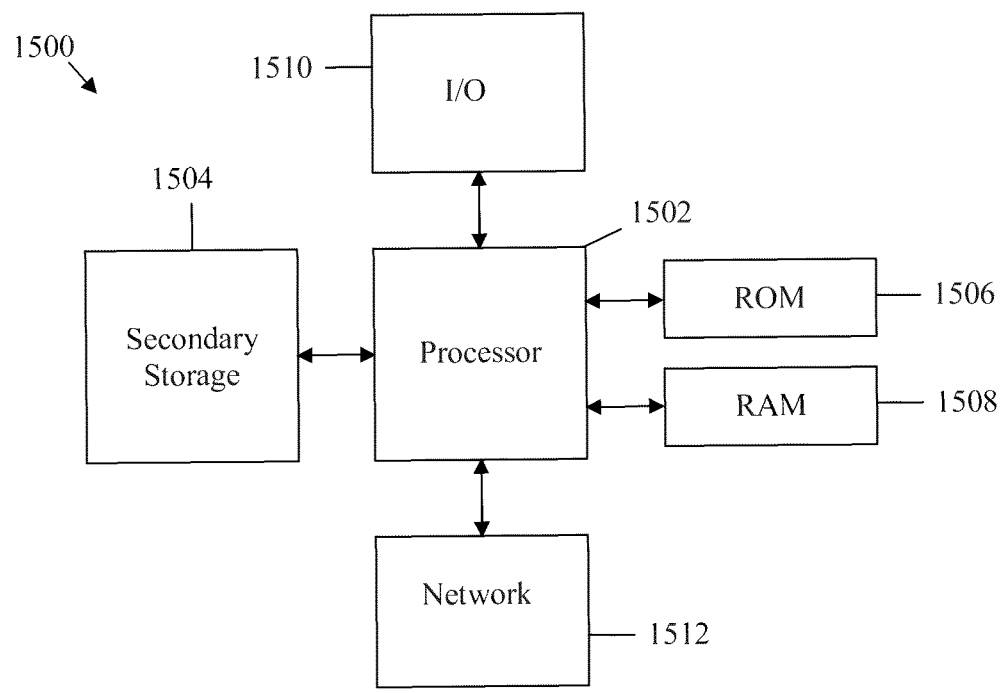
FIG. 15 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 15 illustrates a typical, general-purpose network component 1500 suitable for implementing one or more embodiments of the components disclosed herein. The network component 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network connectivity devices 1512. The processor 1502 may be implemented as one or more CPU chips, or may be part of one or more application specific integrated circuits (ASICs) and/or digital signal processors (DSPs).

The secondary storage 1504 is typically comprised of one or more disk drives or erasable programmable ROM (EPROM) and is used for non-volatile storage of data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network apparatus comprising:
   a trunk end point associated with an Ethernet-tree (E-Tree) service in a network domain,
   wherein the trunk end point is configured to:
      receive a frame that comprises a first tag;

perform a tag translation that maps the first tag to a second tag;
encode the second tag within the frame; and
forward the frame according to the second tag in the frame,
wherein the first tag is used within the network domain and indicates whether the frame originates from a root end point or a leaf end point,
wherein the second tag is used outside the network domain and indicates whether the frame originates from the root end point or the leaf end point, and
wherein the frame is forwarded according to the second tag in the frame to a second end point associated with the E-tree service outside the network domain.

2. The network apparatus of claim 1, wherein the trunk end point is a first provider edge (PE) and the second end point is a second PE located at a second network domain.

3. The network apparatus of claim 2, wherein the network domain is a Multiprotocol Label Switching (MPLS) network domain and the second network domain is a second MPLS network domain or an Ethernet network domain.

4. The network apparatus of claim 1, wherein the trunk end point is an Autonomous System Boundary Router (ASBR) and the second end point is a second ASBR located at a second network domain, and wherein the network domain is a Multiprotocol Label Switching (MPLS) Autonomous System (AS) domain and the second network domain is a second MPLS AS domain.

5. The network apparatus of claim 1, wherein the trunk end point is associated with a provider edge (PE) that comprises a bridge capable device that is coupled to a plurality of customer edges, wherein a second trunk end point that corresponds to the trunk end point is associated with a second PE that comprises a second bridge capable device that is coupled to a plurality of second customer edges, and wherein the PE and the second PE are coupled to each other via a pseudowire (PW).

6. The network apparatus of claim 1, wherein the trunk end point is a bridge capable device that is coupled to a plurality of customer edges via a plurality of attachment circuits (ACs), and wherein the second end point is a provider edge (PE) that is coupled to the bridge capable device via a single pseudowire (PW).

7. The network apparatus of claim 1, wherein the trunk end point is a switching device that is coupled to a plurality of customer edges via a plurality of attachment circuits (ACs), and wherein the second end point is a provider edge (PE) that is coupled to the switching device via a plurality of pseudowires (PWs) that correspond to the ACs.

8. A network component comprising:
a receiver unit configured to receive a frame on an Ethernet-tree (E-Tree) service in a network domain,
a logic circuit configured to:
detect a tag in the frame that indicates whether the frame is sent from a root source or a leaf source; and
perform a tag translation that translates the tag used within the network domain to a second tag used outside the network domain;
encode the second tag within the frame; and
a transmitter unit coupled to the logic circuit and configured to forward the frame on the E-Tree service according to the second tag,
wherein the second tag indicates whether the frame is sent from the root source or the leaf source,
wherein the E-Tree services is an Ethernet-Local Area Network (E-LAN) service that spans across at least the network domain and a second network domain.

9. The network component of claim 8, wherein the frame is received in the network domain, and wherein the frame is forwarded on a trunk interface between the network domain and the second network domain after performing the tag translation.

10. The network component of claim 9, wherein the tag is a root tag that indicates the frame is sent from the root source, and wherein the second tag is a second root tag used on the trunk interface.

11. The network component of claim 8, wherein the frame is forwarded on a trunk interface between the network domain and a second network domain and then received in the second network domain before performing the tag translation.

12. The network component of claim 8, wherein the logic circuit is further configured to discard the frame when the tag in the frame is a leaf tag and the frame's destination domain does not comprise a root end point.

13. The apparatus of claim 1, wherein the second end point is a leaf end point when the first tag and second tag are root tags that indicate the frame originates from the root end point.

14. The apparatus of claim 1, wherein the second tag is a leaf tag used outside the network domain when the first tag is a leaf tag used within the network domain, and wherein the second end point is a root end point.

15. The apparatus of claim 1, wherein the trunk end point is further configured to identify a root tag and a leaf tag used within the network domain and identify a second root tag and a second leaf tag used outside the network domain.

16. The network component of claim 8, wherein the transmitter unit is further configured to forward the frame to a leaf end point on the E-tree service outside the network domain when the tag indicates the frame is sent from the root source.

17. The network component of claim 8, wherein the transmitter unit is further configured to forward the frame to a root end point on the E-tree service outside the network domain when the tag indicates the frame is sent from the root source or the leaf source.

18. The network component of claim 8, wherein the logic circuit is further configured to track a root tag and a leaf tag associated with the network domain and track a second root tag and a second leaf tag associated with the second network domain.

19. The network component of claim 11, wherein the second tag is used in the second network domain.

20. The network component of claim 11, wherein the second tag is a root tag or a leaf tag used for the trunk interface, and wherein the second tag is replaced by a third tag that is used in the second network domain.

* * * * *